United States Patent [19]

Jacobs et al.

[11] 3,710,353

[45] Jan. 9, 1973

[54] THERMAL CAPACITATIVE-FERROELECTRIC STORAGE DEVICE

[75] Inventors: John T. Jacobs, San Jose; Kenneth L. Keester, Mountain View; Benjamin D. Silverman, San Jose, all of Calif.

[73] Assignee: International Business Machines Corporation, Armonk, N.Y.

[22] Filed: Dec. 30, 1971

[21] Appl. No.: 214,357

[52] U.S. Cl.......340/173.2, 340/173 CA, 340/173 LS

[51] Int. Cl...........................G11c 11/22, G11c 11/24

[58] Field of Search...340/173 CA, 173 LM, 173 LS, 340/173.2, 173 LT

[56] References Cited

UNITED STATES PATENTS 3,148,354 9/1964 Schaffert..........................340/173.2

*Primary Examiner*—Terrell W. Fears
*Attorney*—Melvyn D. Silver et al.

[57] ABSTRACT

A data storage apparatus comprising a memory element having a ferroelectric region in contact with a thermal capacitive region, the thermal capacitive region being a region exhibiting a change in capacitance with a change in temperature sufficient that when a voltage is applied across a selective volume of the memory element, and energy is applied to the thermal capacitive region, a voltage transfer occurs from the thermal capacitive region to the ferroelectric region, resulting in a net voltage across the ferroelectric region capable of causing polarization reversal, or switching of the state of polarization of the ferroelectric region. By measuring current during the switching process, a determination is made whether the region was or was not switched resulting in knowledge of the prior state of polarization of the region and hence, whether a "zero" or a "one" was previously stored in the region. Reading may also be done by optical polarization reading techniques.

34 Claims, 3 Drawing Figures

THERMAL CAPACITATIVE-FERROELECTRIC STORAGE DEVICE

FIELD OF THE INVENTION

Ferroelectric storage devices in general, and ferroelectric storage devices in particular associated with a switching medium, to cause a change in state of polarization under a combination of an applied energy and applied voltage situation.

PRIOR ART

Several ferroelectric storage systems have been proposed, one in particular being "Ferroelectric Recording Apparatus," by R. M. Schaffert, U.S. Pat. No. 3,148,354, and assigned to the assignee of this invention. In the particular method disclosed, a photoconductive medium is disposed in electrical contact with a ferroelectric medium, such that in the presence of an applied voltage, the application of light energy to a particular portion of the photoconductor generates sufficient current to allow the voltage to pass through the combination of materials, to cause polarization reversal or switching of the particular area of the ferroelectric material beneath the applied light spot. By reading of the current by current reading means, or by optical detection, the prior state of polarization of that volume of ferroelectric material is determined. While this device has many advantages, there is an inherent time delay from the time necessary to generate the photons and the decay time to return the material to its base state, before that particular spot may be accessed again.

Various other ferroelectric devices have been proposed, such as using sputtered films of rare earth doped barium titanate, and utilizing light transmission to determine the polarization state after switching. These devices generally use hard wire addressing constraints.

In general, for ferroelectric memory devices, it is desired that the speed at which the information is stored in the ferroelectric not be limited by the resistivity of the associated addressing material, such as the photoconductor in the Schaffert situation. Further, it would be desirable to eliminate the problems associated with hard wire addressing. Further, it is desired to operate at or near room temperature.

Thus, it is an object of this invention to provide a ferroelectric storage device in combination with the switching medium, that is not limited by the resistivity of the addressing material associated switching device.

Further, another object of this invention is to eliminate the problems associated with hard wire addressing, and to provide a rapid switching technique.

A further object is to provide a ferroelectric device capable of operating at or near room temperature.

Still another object is to provide a ferroelectric device capable of operating at a sufficiently low overall voltage as to prevent voltage leakage across the device causing inadvertent switching of other ferroelectric storage areas in the device.

Further, another object is to provide a ferroelectric storage medium that is inherently stable and provides no chemical interaction problems with the associated dielectric region.

Another object is to provide a data storage apparatus incorporating the particular memory element described, in a usable high speed-high density system.

SUMMARY OF THE INVENTION

These and other objects are met by the thermal capacitive-ferroelectric memory element of this invention. The data recording apparatus described comprises a memory element having a ferroelectric region in electrical contact with a thermal capacitive region. The ferroelectric material is one that can store various states of polarization in a domain structure. The thermal capacitive region represents a region exhibiting a change in capacitance with a change in temperature, and is usually associated with the dielectric anomaly existing in various materials, whereby a very large increase in dielectric constant occurs over a small change in temperature. Further, the apparatus includes means for applying a voltage across a selected volume of the above memory element, and means for applying energy such as laser thermal energy to the thermal capacitive region of the memory element at the selected volume. This causes at least a portion of the voltage across the thermal capacitive region to be transferred across the ferroelectric region as a result of the increased capacitance arising from increased dielectric constant. The applied voltage and applied energy are concurrently chosen to allow the total voltage appearing across the ferroelectric region during the application of the applied energy to the thermal capacitive region to exceed the voltage for ferroelectric polarization reversal in that region. Thus, if the ferroelectric polarization was opposite the polarity of the applied polarization during the time of application of the applied energy, that region will be switched. If it was not opposite but parallel to (aligned with) the applied voltage, no switching occurs. Reading of the state of polarization of that domain region is achieved by reading the current during the applied energy-voltage situation, or by electro-optic means, such as optical polarization detection from that given region.

This embodiment, and other embodiments, will best be understood when read with a general description in conjunction with the following drawings.

IN THE DRAWINGS

GENERAL DESCRIPTION

Figure 1:
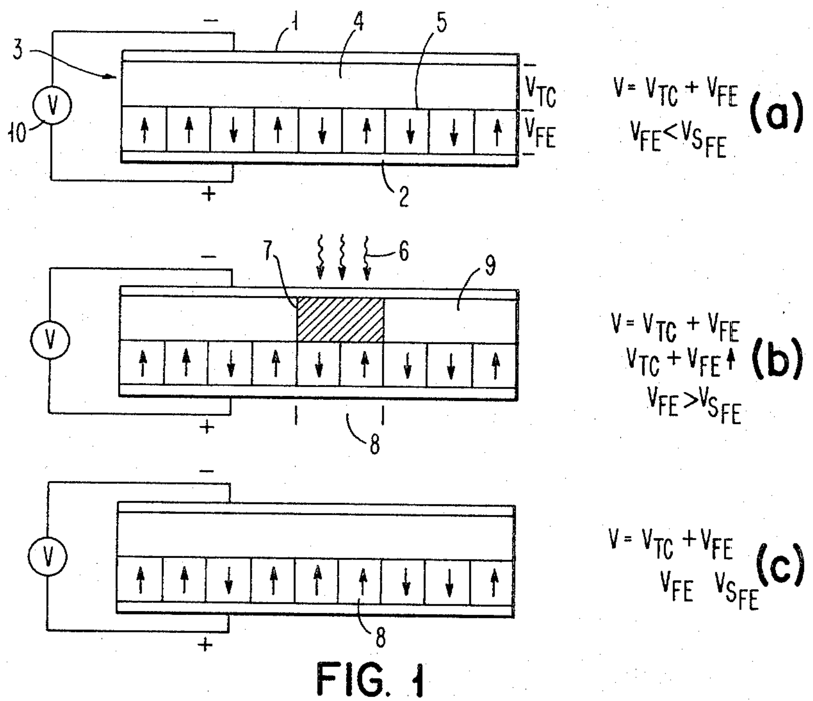
FIG. 1 shows a schematic of three states of the thermal capacitive-ferroelectric memory element before, during, and after application of energy through the thermal capacitive material, showing switching of the ferroelectric region.

FIG. 1 illustrates one embodiment of the thermal capacitive-ferroelectric memory element of this invention. Specifically, FIG. 1A shows a voltage means 10 having an arbitrarily chosen polarity in contact with a first electrode 1, which may be a transparent electrode, and a second electrode 2, which may also be a transparent electrode. These electrodes represent one type of contact means through which the memory element generally designated as 3 may be addressed, and addressing means are known in the art. The word "transparent" of course refers to transparency to a given selected wavelength or wavelength region utilized with the device, as will be evident for the description following. The memory element 3 itself comprises a thermal capacitive region 4 in electrical contact with a ferroelectric region 5. The thermal capacitive region is defined as a region exhibiting a change in capacitance with a change in temperature. Preferably, the thermal capacitive region is a thermal capacitive material exhibiting a dielectric anomaly, such as triglycine sulphate. This anomaly is clearly shown in FIG. 2, where there is a very large increase in the dielectric constant of the material with increasing temperature to approximately 49°C. Materials other than triglycine sulphate are discussed below.

In electrical contact with thermal capacitive region 4 is ferroelectric material 5. Ferroelectric materials are well known in the art, and the material is illustrated as having for simplicity a region of parallel domains of varying polarity direction. The tips of the arrows represent the positive direction of charge in that particular polarization state for that domain. Thus, in FIG. 1A a situation exists where voltage is applied across the memory element through the transparent electrodes 1, 2. The voltage across any selected volume of the memory element 3 is illustrated by the equation $$V = V_{TC} + V_{FE},$$

where $V_{TC}$ is the voltage drop across the thermal capacitive region, and $V_{FE}$ is the voltage drop across the ferroelectric region.

It is evident that the voltage drop across the ferroelectric region must be less than the voltage capable of causing polarization reversal or switching. This is shown as:

$$V_{FE} < V_{sFE}$$

As a ratio, the initial voltage division in the memory element is given by:

$$V_{FE}/V_{Total} = t_{FE}\epsilon_{TC}/\epsilon_{FE}t_{TC} + \epsilon_{TC}t_{FE}$$

where $t_{TC}$ and $t_{FE}$ are the thickness of the thermal capacitive and ferroelectric regions respectively, and where $\epsilon$ represents the respective dielectric constants of the materials.

Figure 2:
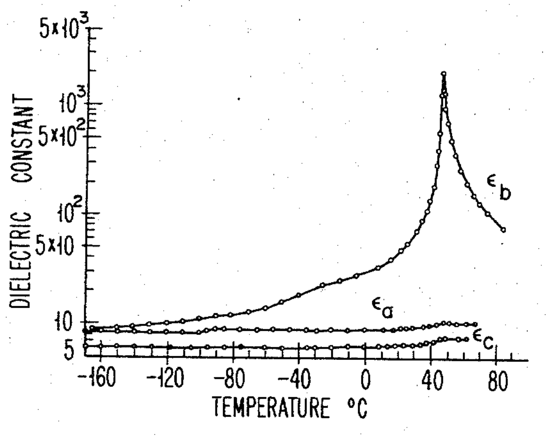
FIG. 2 is illustrative of a dielectric anomaly occurring in triglycine sulphate as a function of temperature.

Local heating of the thermal capacitive material causes $\epsilon_{TC}$ to increase, as previously illustrated in FIG. 2. The above equation indicates that the voltage across the ferroelectric will correspondingly increase by a voltage transfer technique. Thus, a major fraction of the applied voltage can be made to appear across the ferroelectric region in electrical contact with the heated volume of the thermal capacitive region. Thus, in FIG. 1B the application of energy 6, shown in the form of photons which may be for example infrared heat or laser energy, heats a particular volume 7 of the thermal capacitive region, which is adjacent a particular volume 8 of the ferroelectric region. Thus, while the voltage across the entire volume broadly designated 9 still is $V = V_{TC} + V_{FE}$ , the voltage across the thermal capacitive region decreases due to the sudden large increase in dielectric constant, resulting in an increase in voltage across the ferroelectric region. The transfer from the thermal capacitive region is chosen to add to the base voltage across the ferroelectric region, so that the voltage across the ferroelectric region exceeds the switching voltage across the ferroelectric region at that volume. Consequently, a situation arises whereby the ferroelectric domains within a given volume in the ferroelectric region are switched into alignment with the applied field, as shown in FIG. 1C. FIG. 1C further represents an equilibrium state with the removal of the applied energy 6, and thus is similar to the state shown in FIG. 1A, but with a region 8 switched.

The local ferroelectric polarization can only be switched by applying a sufficiently large switching voltage $\overline{V}_{sFE}$ across the ferroelectric region. Thus, system parameters are chosen that switching voltage only appears across the ferroelectric region adjacent to the thermal capacitive region where energy has been applied. The system constraints are simply $V_{FE}'' < V_s < V_{FE}'$ where '' indicates that the adjacent thermal capacitive region is not heated and ' indicates that the adjacent thermal capacitive material is heated. Thus, by applying energy to the appropriate volume of the thermal capacitive material it is possible to change the polarization of the adjacent or coupled ferroelectric region, i.e., writing is achieved. By detecting changes in the switching current, the initial state of that region or bit can be determined, i.e., reading is achieved. Thus, information in this manner can be stored and retrieved in the ferroelectric region. Reading may also be achieved by use of optical polarization effects, as is well known in various beam addressable file systems utilizing electro-optic readout. In those systems, the state of change of polarization of an applied polarized beam after interacting with the polarized domain illustrates the polarization state of the area addressed. Such systems are well known in the art.

Thus, the operation of the memory element is based upon the fact that capacitive coupling by a thermal capacitive material region of the voltage to the ferroelectric region permits an essentially instantaneous transfer of polarization charges by displacement currents rather than by a slower conduction current. This is an inherently fast method of charge transfer.

Materials utilized include bulk or film form barium titanate and bismuth titanate as the ferroelectric and triglycine sulphate as the thermal capacitive material. By heating of the thermal capacitive region to the transition temperature, capacitively coupled reading and writing can occur.

Basically, the combinations of any thermal capacitive material which may serve as a dielectric material, whether inorganic or organic, and which has a significant change in capacitance with an increase in temperature, and most particularly in a preferred embodiment having a dielectric anomaly, may be coupled with any ferroelectric material. In one embodiment, a ferroelectric material is used whose Curie temperature is greater than the temperature to which the thermal capacitive material will be heated. Still more preferably this is also above the dielectric anomaly where a thermal capacitive material exhibiting such dielectric anomaly is utilized. One such combination is $Bi_4Ti_3O_{12}$ as the ferroelectric and triglycine sulfate as the thermal capacitive material.

In another embodiment, it is preferable to heat the thermal capacitive region to a temperature which will also cause the adjacent ferroelectric region to be heated above its Curie temperature. Thus, as the ferroelectric region cools below the Curie temperature in the presence of the applied voltage, a particular state of polarization may be written into the ferroelectric region through alignment of the domain. Thus, a relatively easy writing technique is permissible without concern for the Curie temperature parameters of the particular ferroelectric material.

Some materials which illustrate a dielectric anomaly near room temperature and which have been successfully utilized as a thermal capacitive material include triglycine sulphate (49°C anomaly), Rochelle salt (25°C) and triglycine selenate (22°C). Perovskite and oxide materials are also useful. These include lead zirconate-lead titanate (230°C), barium titanate (120°C), and barium strontium titanate (40°–120°C), $Sr_4KLiNb_{10}O_{30}$ (140°C), $SrKNb_5O_{15}$ (150°C), $PbMg_{1/3}Nb_{2/3}O_3$(0°C), and Nb doped $KTaO_3$. Some of the above materials concurrently are ferroelectric materials as well as exhibiting the proper thermal capacitive effect. Thus, one may utilize the same material for both purposes, by simply limiting the amount of energy applied to heat a first region, such as region 7 of FIG. 1B to achieve the thermal capacitive effect while the balance of the material acting as ferroelectric region 8 retains its ferroelectric properties and will be switched. Since the same material is utilized for both functions, no chemical problems exist as to interface characteristics. All that is necessary is to apply a means for applying voltage, and maintaining a separate means for applying energy to cause the switching to occur.

This system is not hard wire addressed, eliminating the problems therein, and is inherently faster than a photoconductive/ferroelectric medium. Also, thin film elements may be utilized.

Thus, the parameters involved for a data storage system essentially comprises utilizing a memory element having a ferroelectric region in electrical contact with a thermal capacitive region. Means are utilized for applying a voltage across a selected volume of the memory element. Means are then utilized to apply energy to the thermal capacitive region of the memory element at the selected volumes desired to be switched or read, causing at least a portion of the voltage across the thermal capacitive region to be transferred across the ferroelectric region, the applied voltage and applied energy concurrently chosen to allow the voltage appearing across the ferroelectric region during the application of the applied energy to exceed the voltage for ferroelectric polarization reversal in that region.

Figure 3:
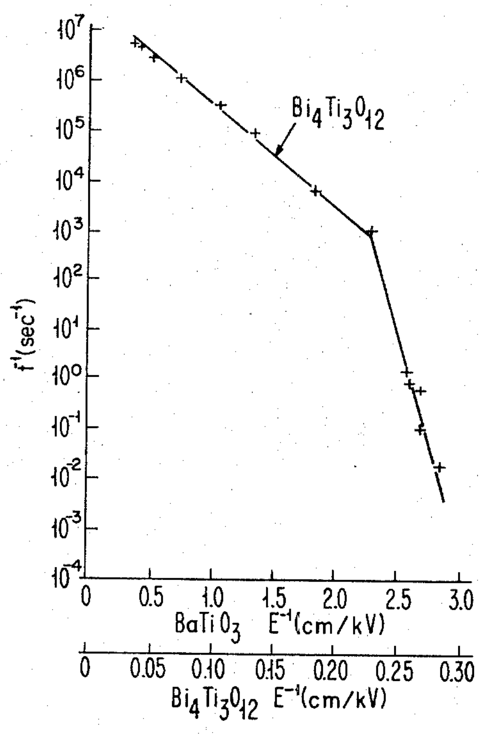
FIG. 3 shows a plot of reciprocal switching time vs. reciprocal applied field for $Bi_4Ti_3O_{12}$ ferroelectric material.

For example, for the ferroelectric material $Bi_4Ti_3O_{12}$, a plot of switching speed versus switching voltage, ($t^{-1}$( $sec^{-1}$) vs $E^{-1}$(cm/kv) for a 0.001 inch crystal) shows that a reduction in switching voltage $V_{sFE}$ increases the switching time by a factor of $10^9$. Thus any disturb pulse which is less than 0.3 $V_s$, as shown in FIG. 3, will have a negligible effect on the stored information. A triglycine sulfate region in series with the $Bi_4Ti_3O_{12}$ ferroelectric meets the disturb requirement and permits thermal switching of the information stored in the $Bi_4Ti_3O_{12}$. As shown previously, $$V_{FE}/V_{TC} = t_{FE}\,\epsilon_{TC}/t_{TC}\,\epsilon_{FE}$$

Using a ferroelectric region five times as thick as the thermal capacitive region, and the areas being equal, then $$V_{FE}/V_{TOTAL} = \epsilon_{TC}\,t_{FE}/\epsilon_{FE}\,t_{TC} + \epsilon_{TC}\,t_{FE}$$

The base system operating temperature is 40°C. The dielectric constant of the TGS is $1.5 \times 10^2$, and for $Bi_4Ti_3O_{12}$, $\epsilon = 1.10 \times 10^2$. At 49°C, $\epsilon_{TGS} = \epsilon_{TC} = 2.5 \times 10^3$ (FIG. 2). Therefore, the ratio of the disturb to switching voltage is given by $$\frac{V_{\mathrm{Disturb}}}{V_{\mathrm{Switching}}} = \frac{\frac{V_{\mathrm{FE}}}{V_{\mathrm{TOTAL}}}\ T = 40^\circ \mathrm{C}.}{\frac{V_{\mathrm{FE}}}{V_{\mathrm{TOTAL}}}\ T = 49^\circ \mathrm{C}.\ \mathrm{for}\ TC} = \frac{.167}{.82} = .204$$

which is less than $0.3 \times V_{Switching}$, as previously noted to be desired in this example.

The heat input for activating the TGS to the dielectric anomaly is also easily calculated as is known in the art. For a 10$\mu$ dia × 1$\mu$ thick bit size, the bit volume is $V = \pi R^2\, l = 3.1416\ (5 \times 10^{-4})^2\ (1 \times 10^{-4}) = 78.5 \times 10^{-12} cm^3$. The specific heat of TGS is approximately $C_v = 0.425$ cal/cm$^3$.

For the base operating temperature of 40°C, a temperature change of 9°C brings the TGS to its anomaly point. The required heat is $H = T \times C_V \times V =$ $$= 9 \times 0.425 \times 78.5 \times 10^{-12} = 296 \times 10^{-12}\ \mathrm{cal}$$

$$= 296 \times 4.18 \times 10^{-12}\ \mathrm{Joules} = 1.2 \times 10^{-9}\ \mathrm{Joules/bit}.$$

Thus, one may easily and directly calculate the required voltages and heat inputs for various combinations of material from data known and published in the art.

The state of ferroelectric polarization will be reversed in the ferroelectric region when that state is opposite the applied voltage polarity. Further, one may read the stored polarization state when the polarization state is parallel to or switched to the applied voltage polarity, by simply reading the current passing through the system during the switching or non-switching during the applied energy application.

The thermal capacitive region may be a region exhibiting a dielectric anomaly, or may be one having a significant change or increase in dielectric constant over a given temperature range. The system may also include a means for maintaining the memory element at a temperature just prior to the anomaly region temperature. Thus, for the illustration of triglycine sulphate, the system may be maintained at a temperature of for example 40°C. A small increase in temperature of only 9°C at a localized region causes a large increase in dielectric constant resulting in large transfer of voltage. However, if the same material is utilized but a large basic voltage charge is maintained upon the ferroelectric material but just less than switching voltage, then a lesser increase in dielectric constant would be sufficient to transfer enough energy to cause switching in the ferroelectric region. The particular energy applied and voltage applied may be calculated from a knowledge of the switching voltage required for a given ferroelectric material, as illustrated previously. However, it is generally preferably in ferroelectric storage systems to maintain a minimum voltage across the ferroelectric plane. Consequently, it is preferable to have the largest voltage drop across the thermal capacitive material. This prevents voltage leakage across a ferroelectric plane that may cause switching in unwanted regions of the ferroelectric. Thus, where a large dielectric increase occurs, as with anomaly materials, the preferable system occurs.

The thermal capacitive region may be an arbitrary part of a ferroelectric material exhibiting both a dielectric anomaly for example, or more general thermal capacitive effects, in conjunction with its ferroelectric properties. Some such materials have been mentioned above, and others are known.

The means for addressing this system may include means for addressing any one of a selected number of selected volumes concurrently by the applied voltage means and applied energy means. Thus, any number of areas or volumes may be addressed. Further, while a continuous ferroelectric plane is implied, it is also clear that discreet ferroelectric storage areas may be utilized in the form of dots deposited for example upon the thermal capacitive material, which may in turn be deposited upon a first electrode means such as transparent electrode 1, and the final layer, electrode 2, deposited thereupon. Various configurations for addressing ferroelectric memories are known in the art. The additional requirement in this invention is the concurrent use of the applied energy means with the known electrical addressing means in the particular memory element of this invention.

The applied energy means may be a laser energy source an infrared source, or other means of applying energy to the particular volume desired to be heated. The energy applying means may be chosen to be one that applies energy not only sufficient to cause the increase in dielectric constant in the thermal capacitive region necessary for switching by transfer of voltage to the ferroelectric region, but may also be chosen in conjunction with the ferroelectric material to heat the ferroelectric material above its Curie point. This causes the effect described previously upon cooling back through the Curie point. Further, the system may include means for determining the current flow at any selected volume during the application of the applied energy and applied voltage to that volume. Alternatively, means might be included such as optical means for determining the polarization states of any selected volume of the ferroelectric region at any time concurrent with or independent from the switching cycle.

More generally, considering the various ferroelectric storage systems involved, what has also been described is a memory element for use in a ferroelectric storage system whereby the concurrent application of energy and voltage to a selected volume of the memory element causes a change in a state of polarization of that volume of the element where the improvement of this invention comprises a memory element comprising a thermal capacitive region in electrical contact with a ferroelectric region. Thus, in its most basic form, this invention utilizes the simple and direct memory element described above. The methods of this invention may be equally stated as a method of reading data in a ferroelectric material, or a method of writing data in a ferroelectric material, comprising the steps of applying a voltage across a selected volume of the memory element comprising a thermal capacitive region in electrical contact with the ferroelectric region, where the total applied voltage is capable to cause polarization reversal in the ferroelectric region while the voltage drop across that region is incapable for such reversal; then, applying energy to a selected volume of the thermal capacitive region to increase the dielectric constant of the thermal capacitive region at that volume to transfer at least a portion of the voltage across the thermal capacitive region to the corresponding volume in the ferroelectric region to increase the voltage across that ferroelectric region to that capable to cause polarization reversal in that region; and then detecting the polarity of the selected volume. As stated previously, the selected volume polarity may be detected by optical or electrical means. The materials described in conjunction with the embodiments previously described are applicable here.

Thus, a broad range of materials may be utilized in conjunction with well known means for applying a voltage, including well known transparent electrode means, to allow charge storage for reading and writing in a ferroelectric material. Most particularly, since the same ferroelectric material can be utilized both for its thermal capacitive and ferroelectric properties, ease of fabrication and elimination of chemical interface effects may be achieved in a most simple and direct manner. Thin film devices may be manufactured by sputtering or by vacuum deposition, or other means known in the art.

Thus, what has been described is a thermal capacitive-ferroelectric memory element that can be used in bulk or thin film form to store information. The speed at which the information is stored is not limited by the resistivity in the thermal capacitive material. Hard wire addressing is eliminated. Devices operating at or near room temperature may be constructed, and it is preferable to use a thermal capacitive material which has a dielectric anomaly slightly above the operating temperature chosen for the system. However, any material showing a sufficient increase in dielectric constant concurrent with the applied voltage across the system in combination with the necessary switching voltage may also be utilized. A broad range of thermal capacitive and ferroelectric materials are available.

What is claimed is:

1. A data storage apparatus comprising:

a memory element having a ferroelectric region in electrical contact with a thermal capacitive region, means for applying a voltage across a selected volume of the memory element, and means for applying energy to the thermal capacitive region of the memory element at the selected volume causing at least a portion of the voltage across the thermal capacitive region to be transferred across the ferroelectric region, the applied voltage and applied energy concurrently chosen to increase the total voltage appearing across the ferroelectric region during only the application of the applied energy to exceed the voltage for ferroelectric polarization reversal in that region, to reverse the state of ferroelectric polarization in that ferroelectric region when that polarity state is opposite the applied voltage polarity, and means for detecting the state of polarization of the selected volume of the ferroelectric region.

2. The data storage apparatus of claim 1 wherein the thermal capacitive region is of a material having a dielectric anomaly.

3. The data storage apparatus of claim 2 including means for maintaining the memory element at a temperature below the anomaly region temperature.

4. The data storage apparatus of claim 1 wherein the thermal capacitive region is of a ferroelectric material having a dielectric anomaly.

5. The data storage apparatus of claim 1 wherein the thermal capacitive region is of a material chosen from the group consisting of triglycine sulphate, Rochelle salt and triglycine selanate.

6. The data storage apparatus of claim 1 wherein the ferroelectric region is of a material chosen from the group consisting of ferroelectric perovskite and ferroelectric oxide materials, lead zirconate-lead titanate, barium titanate, barium strontium titanate, $Sr_4KLiNb_{10}O_{30}$, $SrKNb_5O_{15}$, and $PbMg_{1/3}Nb_{2/3}O_3$, $Bi_4Ti_3O_{12}$.

7. The data storage apparatus of claim 1 wherein the ferroelectric region and the thermal capacitive region are of the same material chosen from the group consisting of lead zirconate-lead titanate, barium titanate, barium strontium titanate, $Sr_4KLiNb_{10}O_{30}$, $SrKNb_5O_{15}$, and $PbMg_{1/3}Nb_{2/3}O_3$, $Bi_4Ti_3O_{12}$.

8. The data storage apparatus of claim 1 including means for concurrently addressing any one of a selected number of selected volumes concurrently with the applied voltage means and applied energy means.

9. The data storage apparatus of claim 1 wherein the applied energy means is a laser energy source.

10. The data storage apparatus of claim 1 wherein the applied energy means is a thermal energy generating means.

11. The data storage apparatus of claim 1 wherein the ferroelectric region and the thermal capacitive region are of the same ferroelectric material.

12. The data storage apparatus of claim 1 wherein the means for applying energy is sufficient to raise the ferroelectric region above its Curie point.

13. The data storage apparatus of claim 1 wherein the detecting means comprises means for determining the current flow at any selected volume during the application of the applied energy and applied voltage.

14. The data storage apparatus of claim 1 wherein the detecting means comprises optical means for determining the polarization state of any selected volume of the ferroelectric region.

15. A memory element for use in a ferroelectric data storage system whereby the concurrent application of energy and voltage to a selected volume of the memory element causes a change in the state of the polarization of the element, the improvement comprising a memory element comprising a thermal capacitive region in electrical contact with a ferroelectric region.

16. The data storage apparatus of claim 15 wherein the thermal capacitive region is of a material having a dielectric anomaly.

17. The data storage system of claim 15 wherein the thermal capacitive region is of a ferroelectric material having a dielectric anomaly.

18. The data storage system of claim 15 wherein the thermal capacitive region is of a material chosen from the group consisting of triglycine sulphate, Rochelle salt and triglycine selanate.

19. The data storage system of claim 15 wherein the ferroelectric region is of a material chosen from the group consisting of ferroelectric perovskite and ferroelectric oxide materials, lead zirconate-lead titanate, barium titanate, barium strontium titanate, $Sr_4KLiNb_{10}O_{30}$, $SrKNb_5O_{15}$, and $PbMg_{1/3}Nb_{2/3}O_3$, and $Bi_4Ti_3O_{12}$.

20. The data storage system of claim 15 wherein the ferroelectric region and the thermal capacitive region are of the same material chosen from the group consisting of lead zirconate-lead titanate, barium titanate, barium strontium titanate, $Sr_4KLiNb_{10}O_{30}$, $SrKNb_5O_{15}$, and $PbMg_{1/3}Nb_{2/3}O_3$, and $Bi_4Ti_3O_{12}$.

21. The data storage system of claim 15 wherein the ferroelectric region and the thermal capacitive region are of the same ferroelectric material.

22. The method of reading data in a ferroelectric material comprising:

applying a voltage across a selected volume of a memory element comprising a thermal capacitive region in electrical contact with a ferroelectric region, the total applied voltage capable to at least cause polarization reversal in the ferroelectric region while the voltage drop across that region is incapable for such reversal, applying energy to the thermal capacitive region to increase the dielectric constant of the thermal capacitive region to transfer at least a portion of the voltage across the thermal capacitive region to the ferroelectric region to increase the voltage across the ferroelectric region to cause polarization reversal in that region when that polarity is opposite the applied voltage polarity, and detecting the polarity of the selected volume.

23. The method of claim 22 wherein the thermal capacitive region is of a material having a dielectric anomaly.

24. The method of claim 23 including the step of maintaining the memory element at a temperature just prior to the anomaly region temperature.

25. The method of claim 22 wherein the thermal capacitive region is of a ferroelectric material having a dielectric anomaly.

26. The method of claim 22 wherein the thermal capacitive region is of a material chosen from the group consisting of a triglycine sulphate, Rochelle salt and triglycine selanate.

27. The method of claim 22 wherein the ferroelectric region is of a material chosen from the group consisting of ferroelectric perovskite and ferroelectric oxide materials, lead zirconate-lead titanate, barium titanate, barium strontium titanate, $Sr_4KLiNb_{10}O_{30}$, $SrKNb_5O_{30}$, and $PbMg_{1/3}Nb_{2/3}O_3$, and $Bi_4Ti_3O_{12}$.

28. The method of claim 22 wherein the ferroelectric region and the thermal capacitive region are of the same material chosen from the group consisting of lead zirconate-lead titanate, barium titanate, barium strontium titanate, $Sr_4KLiNb_{10}O_{30}$, $SrKNb_5O_{30}$, and $PbMg_{1/3}Nb_{2/3}O_3$, and $Bi_4Ti_3O_{12}$.

29. The method of claim 22 including the step of concurrently addressing any one of a selected number of selected volumes concurrently with the application of voltage and the application of energy to that selected volume.

30. The method of claim 22 wherein the ferroelectric region and the thermal capacitive region are of the same ferroelectric material.

31. The method of claim 22 wherein applying energy to the thermal capacitive region is additionally sufficient to raise the associated ferroelectric region above its Curie point.

32. The method of claim 22 wherein detecting the polarity of a selected volume is by determining the current flow at any collected volume during the application of the applied energy and applied voltage.

33. The method of claim 22 wherein detecting the polarity of the selected volume is by optically detecting the polarization state region of any selected volume of the ferroelectric region.

34. The method of writing data in a ferroelectric material comprising:

applying a voltage across a selected volume of a memory element comprising a thermal capacitive region in electrical contact with a ferroelectric region, the total applied voltage capable to cause polarization reversal in the ferroelectric region while the voltage drop across that region is incapable for such reversal, and applying energy to the thermal capacitive region to increase the dielectric constant of the thermal capacitive region to transfer at least a portion of the voltage across the thermal capacitive region to the ferroelectric region to increase the voltage across the ferroelectric region to cause polarization reversal in that region when that polarity is opposite the applied voltage polarity.

* * * * *